United States Patent
Míguez Charines et al.

(10) Patent No.: US 9,676,147 B2
(45) Date of Patent: Jun. 13, 2017

(54) METHOD OF MANUFACTURING T-SHAPED STRINGER WITH A ROUNDED WEB END

(71) Applicant: AIRBUS OPERATIONS S.L., Getafe-Madrid (ES)

(72) Inventors: Yolanda Míguez Charines, Getafe-Madrid (ES); Gabriel Cerdeño Cabello, Getafe-Madrid (ES); Juan Pedro Barrado Ruiz, Getafe-Madrid (ES); Augusto Pérez Pastor, Getafe-Madrid (ES)

( * ) Notice: Subject to any disclaimer, the term of this patent is extended or adjusted under 35 U.S.C. 154(b) by 85 days.

(21) Appl. No.: 14/575,569

(22) Filed: Dec. 18, 2014

(65) Prior Publication Data

US 2015/0174831 A1    Jun. 25, 2015

Related U.S. Application Data

(63) Continuation of application No. PCT/ES2013/070437, filed on Jun. 28, 2013.

(30) Foreign Application Priority Data

Jun. 29, 2012 (ES) .................................. 201231019

(51) Int. Cl.
*B29C 70/30* (2006.01)
*B29C 53/04* (2006.01)
(Continued)

(52) U.S. Cl.
CPC .............. *B29C 70/30* (2013.01); *B29C 53/04* (2013.01); *B29C 70/42* (2013.01);
(Continued)

(58) Field of Classification Search
None
See application file for complete search history.

(56) References Cited

U.S. PATENT DOCUMENTS

| | | |
|---|---|---|
| 2007/0039284 A1 | 2/2007 | Munoz et al. |
| 2008/0115555 A1 | 5/2008 | Depase et al. |
| 2011/0315307 A1 | 12/2011 | Perez et al. |

FOREIGN PATENT DOCUMENTS

| | | |
|---|---|---|
| EP | 1 481 790 | 12/2004 |
| GB | 2 486 231 | 6/2012 |

OTHER PUBLICATIONS

International Search Report for Application No. PCT/ES2013/070437 dated Nov. 28, 2013.

*Primary Examiner* — Barbara J Musser
(74) *Attorney, Agent, or Firm* — Jenkins, Wilson, Taylor & Hunt, P.A.

(57) ABSTRACT

A method of manufacturing T-shaped stringers made of composite material, including a second shaping step for shaping laminates into L-shaped preforms, which includes providing a set of tools formed by a fixed tool comprising a lower portion and an upper portion, and a moveable tool comprising a lower element and an upper element. It also includes the segment of the laminate intended for the foot of the preform being located between the lower portion and the upper portion of the fixed tool, and the segment of the laminate intended for the web of the preform being located between the lower element and the upper element of the moveable tool. It further includes vertically moving the moveable tool to progressively bend the web of the preform supporting it on a vertical wall of the fixed tool. The end of its web adopts a rounded shape.

14 Claims, 5 Drawing Sheets

(51) Int. Cl.
*B29C 70/42* (2006.01)
*B29D 99/00* (2010.01)
*B64C 1/06* (2006.01)
*B32B 3/04* (2006.01)
*B32B 37/18* (2006.01)
*B32B 38/00* (2006.01)
*B64C 3/18* (2006.01)
B29L 31/30 (2006.01)
B64C 1/00 (2006.01)

(52) U.S. Cl.
CPC ............ *B29D 99/0003* (2013.01); *B32B 3/04* (2013.01); *B32B 37/18* (2013.01); *B32B 38/0012* (2013.01); *B64C 1/064* (2013.01); *B64C 3/182* (2013.01); B29L 2031/3076 (2013.01); B32B 2038/0076 (2013.01); B32B 2250/00 (2013.01); B32B 2309/68 (2013.01); B32B 2605/18 (2013.01); B64C 2001/0072 (2013.01); Y02T 50/433 (2013.01); Y10T 156/1002 (2015.01); Y10T 428/2419 (2015.01)

METHOD OF MANUFACTURING T-SHAPED STRINGER WITH A ROUNDED WEB END

CROSS-REFERENCE TO RELATED APPLICATION

This application is a continuation of and claims priority to PCT Application Serial No. PCT/ES2013/070437 filed Jun. 28, 2013 which claims the benefit of the filing date of Spanish Application Serial No. P201231019 filed Jun. 29, 2012, the entire disclosures of which are incorporated herein by reference.

TECHNICAL FIELD

The subject matter disclosed herein applies to the aeronautical industry, relating to aircraft stringers. It more specifically relates to T-shaped stringers with a rounded web end and their method of manufacture.

BACKGROUND

One type of conventional stringer has a T-shaped cross-section with a foot and a web. Such T-shaped stringers are usually made up of two L-shaped preforms having the same thickness in the foot and in the web, although there are also L-shaped preforms in which the web area is thicker than the foot area. This difference in thickness is because some stringers have to have higher inertias, so they have an additional number of fabrics as reinforcement in the web area. In both cases, they are manufactured by means of a process comprising a first tape laying step, a second shaping step and a third curing step.

Laying tape comprises stacking bands of pre-impregnated material, for which purpose an ATL machine is commonly used. In this step, the machine deposits bands of pre-impregnated material (carbon fibers pre-impregnated with a resin) on top of others until obtaining the desired laminate with the desired fiber orientation.

The second step for conventionally manufacturing stringers comprises shaping laminates to obtain L-shaped preforms, which will subsequently be attached to one another in twos to obtain a T-shaped stringer. Pressure and a temperature below 100° C. are normally applied when shaping. The purpose is to reduce the viscosity of the resin in order to give the desired shape to the laminate. The resin is never cured.

The third step of the conventional method for manufacturing stringers comprises attaching the preforms to one another such that they form the T-shaped stringer to subsequently cure it. The curing process can be carried out in different ways. The stringers can be placed on the overlay and cured at the same time as the overlay (co-curing), cured separately from the overlay and subsequently bonded on the overlay in an already cured state (secondary bonding), placed while fresh on the overlay in an already cured state and cured in the bonding cycle (co-bonding), or placed in an already cured state on the overlay before drying and the overlay being cured at the same time the stringers are bonded (also co-bonding). Pressure and temperature higher than those applied during shaping are applied when curing because the purpose is to cure the resin and to get the resin to be redistributed in order to fill the cavities that may exist in the part, thereby reducing porosity.

A problem with this conventional method of manufacture is that the stringers manufactured according to this method have beaked excess material at the end of the web that does not withstand loads and is therefore useless weight. Today, this excess material is machined and material is pulled off until obtaining an upper web surface of the stringer that is horizontal and planar. This machining operation can damage the end of the web of the stringer and, even while not damaging it, the resulting structure does not perform well in response to impacts, which can cause peeling in this area.

Another problem with the conventional method arises from the need to identify the damage that may occur given that this area is susceptible to receiving impacts. The dark gray color of these parts made of composite material does not allow the detection, so as of today, the upper portion of the web of the stringer is painted using paint with a color that is lighter than the color of the composite material in order to identify the damage. The problem with this solution is that it is a time-consuming process because since only the upper area of the web of the stringer has to be painted, the rest of it must be previously covered.

SUMMARY

An object of the subject matter disclosed herein is to provide a T-shaped stringer that performs better in response to impacts than the stringers known in the state of the art, in which one end of the web further comprises an area for easy detection of damage caused by the impacts, in addition to a method of manufacturing the stringers that is faster and less expensive than the conventional method.

The subject matter disclosed herein seeks to solve the aforementioned problems by providing a method of manufacturing stringers which comprise a rounded web end, eliminating the need to perform machining that can damage the web of the stringer, and which perform better in response to impacts.

All this entails a reduction of the total stringer manufacturing time, while simultaneously making better use of the material used. The present method of manufacturing stringers in turn comprises a curing tool with inner faces that are adapted to at least the outer geometry of the new stringer in the segment attaching the rounded web end and the foot area close to the fillet radius between the foot and the web. The two areas in which the angle must be adjusted to the part are the fillet radius between the web and foot and the upper area of the web which is rounded.

For the purpose of achieving the objectives and avoiding the drawbacks mentioned in the preceding sections, the subject matter disclosed herein discloses a method of manufacturing T-shaped stringers made of composite material. This method comprises a first tape laying step for laying tape on two planar laminates, a second shaping step for shaping the planar laminates into two L-shaped preforms; and a third step in which the two preforms are attached to one another and cured to obtain the T-shaped stringer.

The mentioned second shaping step comprises, on the one hand, providing a set of tools formed by a fixed tool comprising a lower portion and an upper portion, and a moveable tool comprising a lower element and an upper element, the fixed tool and the moveable tool being arranged at a pre-determined distance from one another. The shaping also comprises arranging each planar laminate in the set of tools such that the segment of the laminate intended for the foot of the L-shaped preform is arranged between the lower portion and the upper portion of the fixed tool and the segment of the laminate intended for the web of the L-shaped preform is arranged between the lower element and the upper element of the moveable tool. This second step of the method of manufacture additionally comprises vertically moving the moveable tool at a pre-determined speed to progressively bend the web of the preform supporting it on a vertical wall of the fixed tool. The end of its web therefore adopts a rounded shape.

One aspect of the present method is to provide the set of tools such that one corner of the fixed tool, towards which the moveable tool moves and on which the fillet radius between the foot and the web is formed, has a radius corresponding with the fillet radius between the foot and the web of the L-shaped preform. The subject matter disclosed herein comprises providing the set of tools such that the element of the moveable tool exerting a thrust pressure on the laminate has rounded corners. Furthermore, another aspect of the subject matter disclosed herein is that it comprises providing the set of tools such that a gap is left between the ends of the moveable tool and the vertical walls of the fixed tool according to the thickness of the preform.

A method object of the subject matter disclosed herein comprises in the tape laying step adding a strip to the laminate in the portion of the laminate which is on the visible face of the end of the web after shaping. Alternatively, the method can comprise adding the strip on the rounded end of the stringer formed after attaching the two preforms to one another and before curing. The strip is lighter in color than the T-shaped stringers, being distinguished from the rest of the laminate, for identifying possible damage. The strip is preferably made of glass fiber.

Another feature of the subject matter disclosed herein is that it comprises curing using a curing tool with inner faces replicating the outer geometry of the rounded web end of the stringer obtained after attaching the two L-shaped preforms to one another and the fillet radius between the foot and the web of the stringer in the case of conventional stringers. In the case of stringers with reinforcement in the web, the curing tool used replicates the outer geometry of the conventional stringer up to a certain height of the web and is placed above a vacuum bag that is placed on the stringer.

Another aspect of the subject matter disclosed herein is that it comprises a T-shaped stringer made of composite material manufactured according to the method described in any of the preceding claims. This stringer comprises a rounded web end.

BRIEF DESCRIPTION OF THE DRAWINGS

For the purpose of better understanding the description that is being made, a set of drawings is enclosed with the subject matter disclosed herein in which the following is depicted with an illustrative and non-limiting character.

Figure 1:
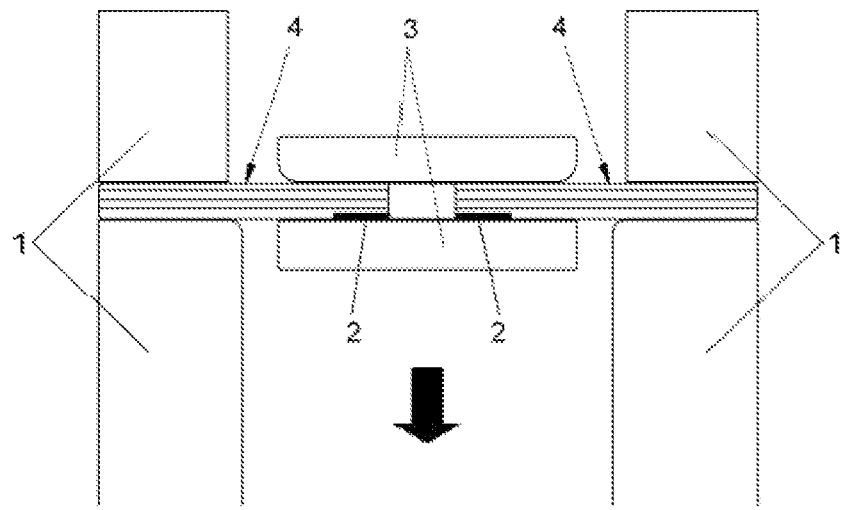
FIGS. 1, 2 and 3 schematically show the method for shaping L-shaped preforms according to the preferred embodiment of the subject matter disclosed herein.

A list of the different elements depicted in the drawings integrating the subject matter disclosed herein is provided below:
1=Fixed tool
2=Strip
3=Moveable tool
4=Laminate
5=Curing tool
6=Preform
7=Stringer
8=Reinforcement fabrics
9=Vacuum bag
10=Curing tool for stringers with reinforcement in the web

DETAILED DESCRIPTION

Novelties of the method of manufacturing T-shaped stringers (7) disclosed by the subject matter disclosed herein compared to the conventional method lie in at least three aspects. One aspect is a novel method for carrying out a shaping step whereby obtaining a T-shaped stringer (7) with a rounded web end, another aspect is the inclusion of a strip (2) for identifying impacts such that a great deal of time is saved, and finally, another aspect is the use of a curing tool (5) with a geometry the inner faces of which are adapted to at least a portion of the outer geometry of the stringers (7) shaped according to the method of the subject matter disclosed herein.

Figure 2:
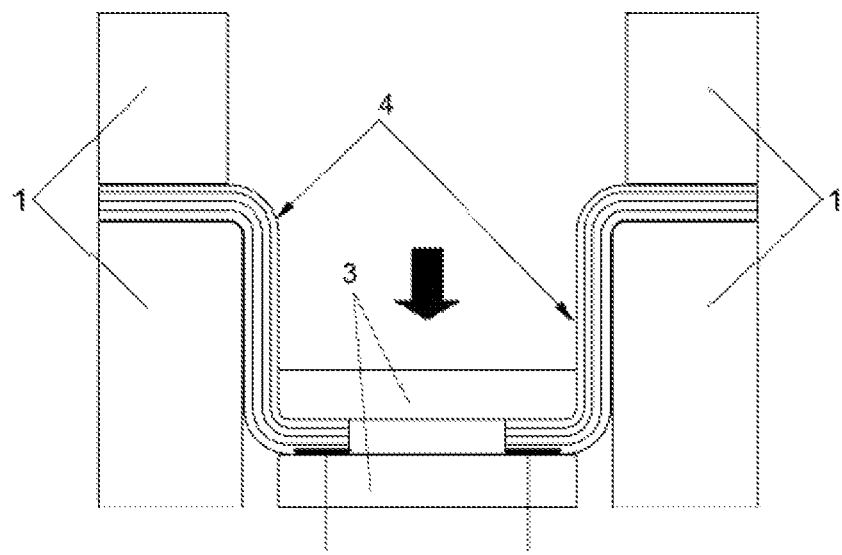
Figure 3:
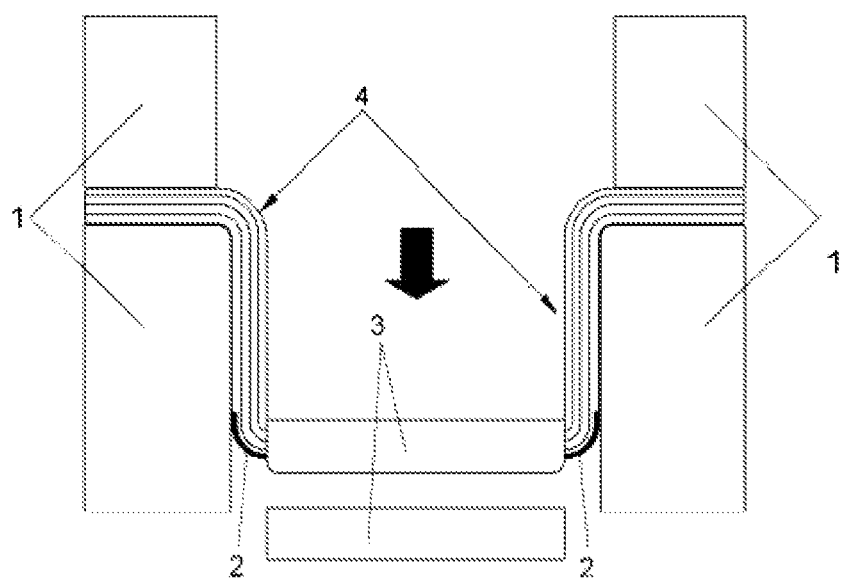

Two L-shaped preforms (6) are simultaneously obtained in the shaping step, FIGS. 1 to 3. To that end, planar laminates (4) having a cross-section such as that shown in FIG. 1 are used as a starting material.

For shaping, on the one hand, there are two fixed tools (1), each of them comprising a lower portion and an upper portion. The tools (1) are placed facing one another, as shown in FIG. 1. A segment of the laminate (4) corresponding to the foot of each of the L-shaped preforms (6) to be shaped is placed between the upper and lower portions of each of the fixed tools (1), the rest of the laminate (4) cantilevered over the area between the mobile tools (3).

On the other hand, there is a moveable tool (3) comprising a lower element and an upper element, and it is placed between the fixed tools (1), holding the ends of each laminate (4) opposite to the ends which are placed in each of the fixed tools (1).

The preforms (6) are shaped by applying heat and very slow vertical movement of the moveable tool (3), at the rate of about 5 mm/min, which leads to bending the laminates (4). The segment of the laminate (4) which was cantilevered before applying this movement and which is now adjusted to the vertical wall of the portion of the fixed tool (1) towards which the moveable tool (3) moves is thus bent.

FIGS. 1 to 3 describe a preferred embodiment of the subject matter disclosed herein for shaping, in which the movement of the moveable tool (3) is downward, in the direction indicated by the arrow. The shaping process can be carried out by the upward or downward movement of the moveable tool (3). Choosing one direction or the other conditions the design of the set of tools, as explained below.

For the case shown in the drawings in which the moveable tool (3) moves downward, the inner corners of the lower portions of the fixed tools (1) are rounded, and the radius coincides with the fillet radius between the foot and the web of the preform (6). Furthermore, the lower portion of the fixed tool (1) is wider than the upper portion, the difference in width corresponding to the radius of the L-shaped preform (6). The lower corners of the upper element of the moveable tool (3) are also rounded, and the radius coincides with the fillet radius between the foot and the web of the preform (6).

In an embodiment not shown in the drawings in which the moveable tool (3) moves upward, in addition to having rounded inner corners, the upper portion of the fixed tool (1) is wider than the lower portion. For this embodiment, the upper corners of the lower element of the moveable tool (3) are the ones that are rounded.

Another aspect to be taken into account concerning the fixed tools (1) and the moveable tool (3) is the distance at which they are located from one another. The distance separating the ends of the moveable tool (3) from each of the fixed tools (1) is defined according to the thickness of the web of the L-shaped preforms (6) to be obtained.

A further aspect to be taken into account concerning the tools (1, 3) is the pressure they exert on the laminate (4) during the shaping process. In the case of the fixed tools (1), the pressure must only be the pressure that is necessary for holding the carbon fiber laminate (4) while the moveable tool (3) moves the segment of the laminate (4) opposite the segment held by each fixed tool (1). It is important not to exert too much pressure. The reason for not holding the laminates (4) too tightly by the fixed tools (1) is that at this point of the manufacturing process, the carbon fiber laminate (4) is in a very fresh state, so it may be easily damaged. The pressure must be the pressure necessary for holding the laminates (4) without them coming out from between the upper portion and lower portion of each fixed tool (1) while shaping, without reducing thickness and without draining the resin off the laminate (4). This pressure can be between 1.5 bars and 1.8 bars.

For the case of the moveable tool (3) the pressure, which is always lower than in the case of fixed tools (1), can range between 0.5 bar and 0.01 bar throughout the shaping cycle. This pressure exerted by the moveable tool (3) only assures the holding by the upper side and by the lower side of the end of the laminate (4) that is gradually being bent during shaping. This bending occurs until the shaping step ends and the ends of the laminate (4) corresponding to the end of the web of each preform (6) come out from between the upper and lower portions of the moveable tool (3).

Figure 4:
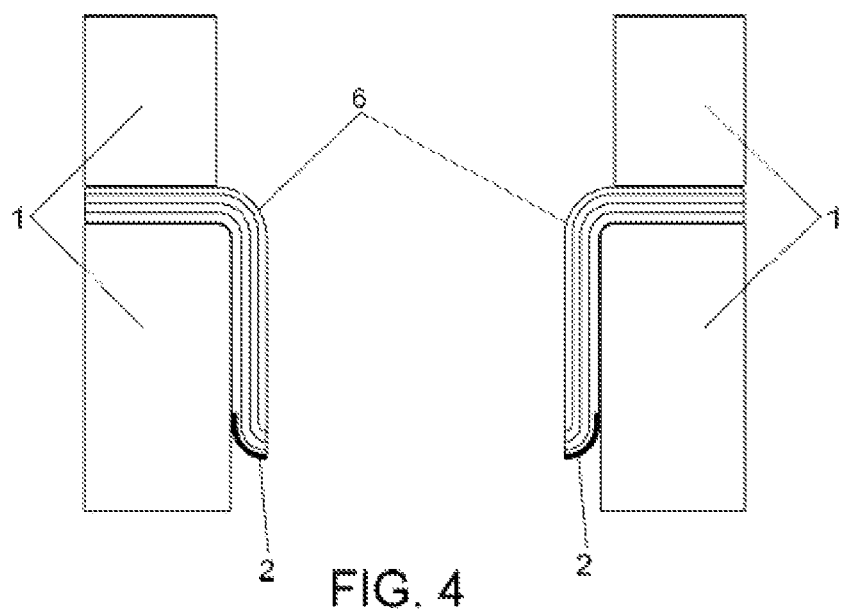
FIG. 4 shows the L-shaped preforms obtained according to the subject matter disclosed herein.
Figure 5:
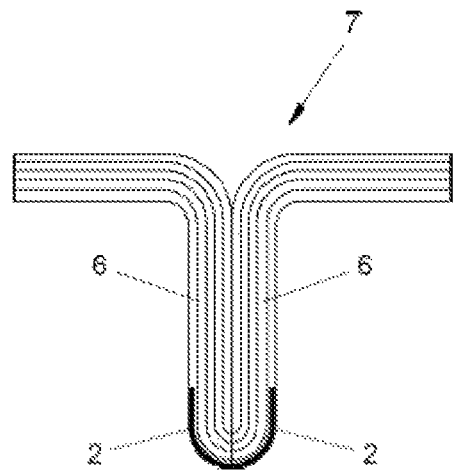
FIG. 5 shows two L-shaped preforms forming a T-shaped stringer according to the subject matter disclosed herein.

Another novel aspect of the method of manufacturing stringers (7) with an upper rounded web end, as indicated at the beginning of this section is the inclusion of the strip (2) for identifying impacts, comprising a thickness between 0.1 mm and 0.3 mm. An option for placing this strip (2) is placing it on the end of the web of the stringer (7) once the L-shaped preforms (6) have been shaped and attached to one another, FIGS. 4 and 5 respectively, to form the T-shaped stringer (7), right before curing.

Another option, being a preferred option, is to place the strip (2) during tape laying. The strip (2) is placed in the portion of the laminate (4) which will be on the visible face of the end of the web of the stringer (7) after shaping. If the moveable tool (3) moves downward during shaping, the strip (2) is placed on the first layer of the tape laying, at the end of the laminate (4) that is held by the two portions of the moveable tool (3), whereas if the moveable tool (3) moves upward during shaping, the strip (2) is placed on the last layer of the laminate (4), also at the end that is held by the two portions of the moveable tool (3).

A requirement that the material of the strip (2) must meet is that it has to be a lighter color than the carbon fiber of the stringers (7) to favor the identification of damage caused by impacts. In a preferred embodiment of the subject matter disclosed herein, the strip (2) is made of glass fiber.

Figure 6:
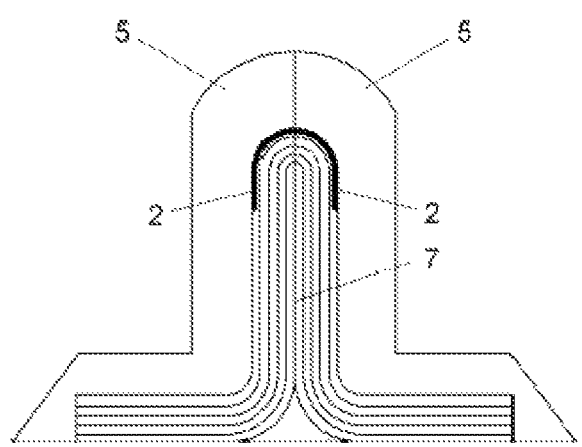
FIG. 6 shows the T-shaped stringer inside a curing implement for curing thereof according to the subject matter disclosed herein.

The third novel aspect of the subject matter disclosed herein is the use of the curing tool (5) with a geometry of its inner faces that adapts at least in part to the outer geometry of the stringers (7) manufactured according to the method of the subject matter disclosed herein. For the case of T-shaped stringers (7) made up of two L-shaped preforms (6) having the same thickness in the web area and in the foot area, the curing tool (5) adapts in its entirety to the outer geometry of the stringers (7) manufactured according to the method of the subject matter disclosed herein, as seen in FIG. 6. These curing tools (5) adapted to the new geometry of T-shaped stringers (7) are important so as to not deform the roundness achieved at the end of the web and in the radius while curing. A vacuum bag (9) is used together with the curing tool (5) in the curing step.

For the mentioned case in which the thickness is the same in the foot and the web, this bag (9) can be located between the T-shaped stringers (7) and the curing tool (5) or on the curing tool (5).

This second option entails covering the assembly shown in FIG. 6 with the vacuum bag (9). When choosing one of these two options, it is important to bear in mind that when the vacuum bag (9) is placed between the stringers (7) and the curing tool (5) as occurs in the first option, it is not necessary for the curing tool (5) to tightly surround the end of the web or the end of the foot, for example, given that the bag (9) itself encircles the area assuring the geometry obtained while shaping. In this first option, the vacuum bag (9) is what is completely tightly surrounding stringer (7) and it is therefore not necessary for the curing tool (5) to reach the ends of both the web and the foot, nor does it have to tightly surround it in such a reliable manner as occurs in the second option. As a result, it is not necessary to adapt or to have a curing tool (5) for each stringer specification, several configurations of a stringer (7) being able to share the same curing tool (5). Nor is it necessary for the tool to be made of invar (iron+nickel) given that is not necessary for the tool to have a coefficient of expansion that is as similar to that of the material of the stringer (7). Therefore, the use of less expensive materials such as iron also allows using a welding that is less expensive and simpler than the attachment required by a material such as "invar" during manufacture. Likewise, in this first option it is possible to dispense of silicone end retainers for preventing adhesive leaks or excessive expansions of the ends of the foot. These silicone end retainers are usually housed in a groove of the curing tool (5) that longitudinally extends close to the end of the foot. In the first option, it has been verified that the vacuum bag (9) performs the retaining function, preventing the need to manually place silicone retainer that gives rise to an expensive manual operation.

In contrast, since the vacuum bag (9) is placed on the stringer (7)-curing tool (5) assembly according to the second option, the vacuum bag (9) cannot tightly surround the end of the web suitably, so in this case it is necessary for the curing tool (5) to tightly surround the end of the web. Nevertheless, in this case there is an additional advantage. An application of great interest uses a plurality of parallel stringers (7) located on the surface of a skin of an airplane wing such that the feet of the stringers (7) rest on the surface of the skin, and the curing tools (5) are in turn located on the corresponding stringer (7). The vacuum bag (9) is placed on the assembly of the skin and the plurality of stringers for curing inside the autoclave.

Figure 7:
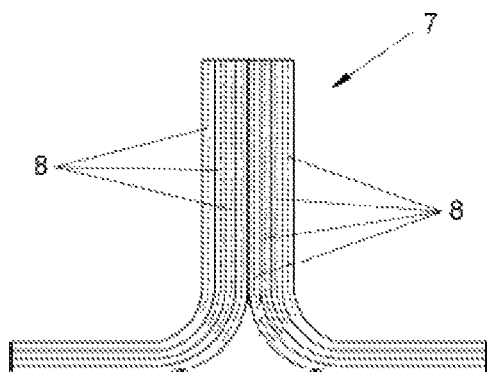
FIG. 7 shows a T-shaped stringer with reinforcement fabrics in the web from the state of the art.

For the case of T-shaped stringers (7) made up of two L-shaped preforms (6) having a different thickness in the web area and in the foot area, modifications are possible to enable the manufacture thereof according to the subject matter disclosed herein. Reinforcement fabrics (8) are intercalated in the tape laying step. These additional fabrics (8) are usually intercalated in the web area, specifically from the area of the fillet radius between the foot and the web of the preform (6) to the end of the web, as can be seen in FIG. 7. The problem with this arrangement of additional fabrics (8) is that the thickness of the area of the fillet radius between the foot and the web of the stringer is not constant and this makes it impossible to obtain stringers (7) with a rounded web end by the method object of the subject matter disclosed herein.

Figure 8:
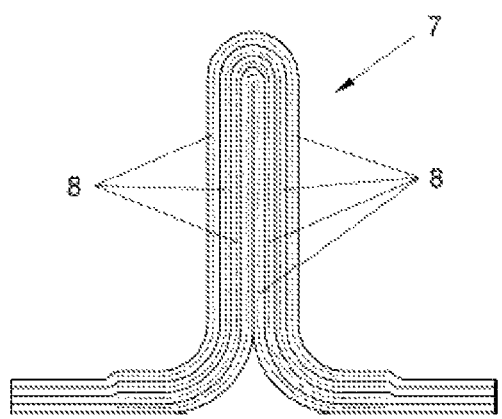
FIG. 8 shows a T-shaped stringer with reinforcement fabrics in the web according to the subject matter disclosed herein.

To enable manufacturing the mentioned reinforced T-shaped stringers (7) according to the method of manufacture object of the subject matter disclosed herein, the reinforcement fabrics (8) are intercalated covering at least a portion of the foot and to the end of the web such that the thickness of the area of the radius is constant, as can be seen in FIG. 8. The fact that the fillet radius between the web and the foot of the L-shaped preforms (6) the thickness is constant is essential for manufacturing reinforced T-shaped stringers (7) according to the present method.

Figure 9:
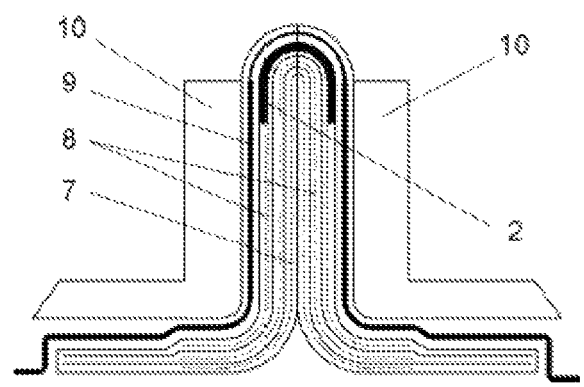
FIG. 9 shows a T-shaped stringer with reinforcement fabrics in the web inside a curing implement for curing thereof according to a preferred embodiment of the subject matter disclosed herein.

In contrast, the curing step for curing these reinforced T-shaped stringers (7) depicted in FIG. 8 requires the use of a vacuum bag (9) such that this bag (9) is placed on the stringer (7), and the curing tool (10) specific for this geometry of the stringers (7) is in turn placed on the vacuum bag (9), as shown in FIG. 9. This is because as mentioned above for the case of stringers (7) with the same thickness in the feet and in the webs, the vacuum bag (9) is what assures compaction, whereas the curing tools (10) simply get the web of the stringers to remain in their plane.

The object of the subject matter disclosed herein is to get the outer layers of the web of the L-shaped preforms (6), which are longer than the inner layers due to the thickness of the laminate (4) and the fillet radius between the foot and the web of the preform (6), to adopt a rounded shape instead of a pointed shape during the shaping step. This is achieved by carrying out shaping with a moveable tool (3) with rounded corners and with lower and upper portions holding the laminate (4) during shaping, such that the outer layers adopt a rounded shape.

An additional reason for the corners of both tools (1, 3) being rounded with a radius of curvature of 2 to 5 millimeters is that the corners could otherwise seriously damage the laminate (4) during shaping, and even more so considering that the laminate (4) in this step of the manufacturing process is fresh.

The persons skilled in the art will understand that various alterations and modifications can be made to the preceding description, although it must be understood that the scope of the subject matter disclosed herein is not limited to the described embodiments and is defined by the attached claims.

While at least one exemplary embodiment of the present disclosure has been shown and described, it should be understood that modifications, substitutions and alternatives may be apparent to one of ordinary skill in the art and can be made without departing from the scope of the disclosure described herein. This application is intended to cover any adaptations or variations of the specific embodiments discussed herein. In addition, in this disclosure, the terms "comprise" or "comprising" do not exclude other elements or steps, and the terms "a" or "one" do not exclude a plural number. Furthermore, characteristics or steps which have been described with reference to one of the above exemplary embodiments may also be used in combination with other characteristics or steps of other exemplary embodiments described above.

The invention claimed is:

1. A method of manufacturing T-shaped stringers made of composite material, the method comprising:
    a first step comprising laying tape on two planar laminates;
    a second step comprising shaping the planar laminates into two L-shaped preforms; and
    a third step comprising attaching the two preforms to one another and curing the two preforms to obtain a T-shaped stringer wherein the second step comprises:
    providing a set of tools having a fixed tool, comprising a lower portion and an upper portion, and a moveable tool, comprising a lower element and an upper element, the fixed tool and the moveable tool being arranged at a pre-determined distance from one another;
    arranging each planar laminate in the set of tools such that a segment of the laminate intended for a foot of the L-shaped preform is arranged between the lower portion and the upper portion of the fixed tool and a segment of the laminate intended for a web of the L-shaped preform is arranged between the lower element and the upper element of the moveable tool; and
    vertically moving the moveable tool at a pre-determined speed to progressively bend the web of the preform, supporting the web on a vertical wall of the fixed tool, such that an end of a web of the T-shaped stringer has a rounded shape.

2. The method of manufacturing stringers according to claim 1, comprising, in the first step, adding a strip to the laminate in a portion of the laminate which is on a visible face of the end of the web after shaping.

3. The method of manufacturing stringers according to claim 1, comprising adding a strip on the rounded end of the stringer formed after attaching the two preforms to one another and before curing.

4. The method of manufacturing stringers according to claim 3, wherein the strip is lighter in color than the T-shaped stringer, being distinguished from a rest of the laminate, for identifying possible damage.

5. The method of manufacturing stringers according to claim 1, comprising providing the set of tools such that one corner of the fixed tool, towards which the moveable tool moves and on which a fillet radius is formed between the foot and the web, has a radius corresponding with the fillet radius between the foot and the web of the L-shaped preform.

6. The method of manufacturing stringers according to claim 1, comprising providing the set of tools such that the lower element and/or the upper element of the moveable tool exerting a thrust pressure on the laminate has rounded corners.

7. The method of manufacturing stringers according to claim 1, comprising providing the set of tools such that a gap is left between ends of the moveable tool and the vertical walls of the fixed tool according to a thickness of the preform.

8. The method of manufacturing stringers according to claim 1, wherein the third step comprises arranging the preforms on a curing tool, on which a vacuum bag was previously arranged, such that the vacuum bag is interposed between the curing tool and the stringer.

9. The method of manufacturing stringers according to claim 8, comprising curing using the curing tool for stringers with reinforcement in the web, which covers at least the web and the reinforcement as well as a fillet radius between the web and the foot of the stringer.

10. The method of manufacturing stringers according to claim 1, wherein the curing in the third step comprises arranging the preforms on a curing tool, comprising inner faces replicating an outer geometry of the rounded web end of the stringer obtained after attaching the two L-shaped preforms to one another and a fillet radius between the foot and the web of the stringer.

11. The method of manufacturing stringers according to claim 8, wherein the curing tool comprises inner faces replicating an outer geometry of the foot of the stringer.

12. The method of manufacturing stringers according to claim 10, wherein one or more stringers, together with the curing tool, are covered by a vacuum bag.

13. The method of manufacturing stringers according to claim 2, wherein the strip comprises glass fiber.

14. The method of manufacturing stringers according to claim 2, wherein the strip is lighter in color than the T-shaped stringers, being distinguished from a rest of the laminate, for identifying possible damage.

* * * * *